(12) United States Patent
Fujishita

(10) Patent No.: US 7,908,525 B2
(45) Date of Patent: Mar. 15, 2011

(54) DATA PROCESSOR, DATA PROCESSING PROGRAM, AND DATA PROCESSING SYSTEM

(75) Inventor: Masahiro Fujishita, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 372 days.

(21) Appl. No.: 12/153,840

(22) Filed: May 27, 2008

(65) Prior Publication Data

US 2008/0301496 A1    Dec. 4, 2008

(30) Foreign Application Priority Data

May 31, 2007    (JP) .............................. P2007-144579

(51) Int. Cl.
*G01F 11/00* (2006.01)
(52) U.S. Cl. .............................................. 714/48; 714/9
(58) Field of Classification Search .................... 714/48
See application file for complete search history.

(56) References Cited

U.S. PATENT DOCUMENTS

| 6,032,266 | A * | 2/2000 | Ichinohe et al. | 714/9 |
| 6,516,440 | B1 * | 2/2003 | Teradaira | 714/763 |
| 6,587,963 | B1 * | 7/2003 | Floyd et al. | 714/25 |
| 7,536,595 | B1 * | 5/2009 | Hiltunen et al. | 714/26 |
| 2006/0048019 | A1 * | 3/2006 | Takahashi | 714/48 |
| 2009/0037513 | A1 * | 2/2009 | Yoda et al. | 709/201 |

FOREIGN PATENT DOCUMENTS

| JP | 08-249215 | 9/1996 |
| JP | 2001-290396 | 10/2001 |
| JP | 2002-196917 | 7/2002 |
| JP | 2004-032511 | 1/2004 |

OTHER PUBLICATIONS

Japanese Office Action, with English translation, issued in Japanese Patent Application No. 2007-144579, mailed Jun. 2, 2009.

* cited by examiner

*Primary Examiner* — Scott T Baderman
*Assistant Examiner* — Kamini Patel
(74) *Attorney, Agent, or Firm* — McDermott Will & Emery LLP

(57) ABSTRACT

A related data storing unit stores a plurality of sets of related data related to a plurality of controlling units. An operation storing unit stores operation detail of each of the plurality of controlling units as an operation log. A identification data recording unit records a plurality of sets of identification data in the operation log. An abnormality data recording unit records abnormality data in the operation log. A data acquiring unit acquires an abnormality data and one of the identification data. A related data acquiring unit identifies one of the related data corresponding to the one of identification data acquired by the data acquiring unit and acquires the one of related data from the related data storing unit. A resolution data storing unit stores first resolution data to resolve the abnormality occurring in the one of control targets in association with the one of related data acquired by the related data acquiring unit and the abnormality data acquired by the data acquiring unit. A resolution data acquiring unit acquires the first resolution data corresponding to the one of the control targets in which the abnormality occurred using the one of related data acquired by the related data acquiring unit and the abnormality data acquired by the data acquiring unit.

10 Claims, 10 Drawing Sheets

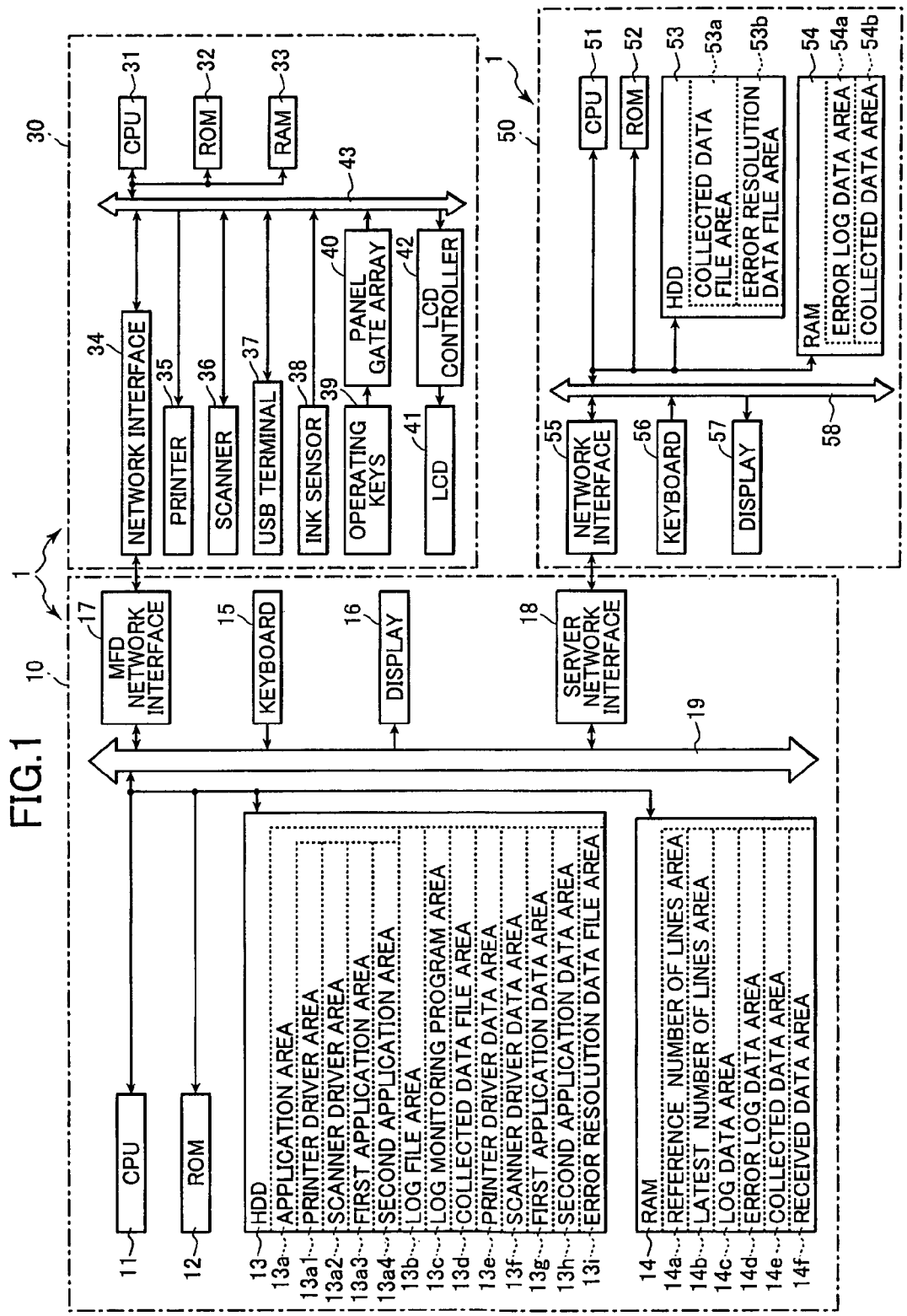

FIG.2

CONTENTS OF LOG FILE AREA 13b

PrinterDriver: Printer:LogLevel3 : Parameter x = 1,y = 2
PrinterDriver: Printer:LogLevel5 : Set Parameter
ScannerDriver : Scanner:LogLevel3 : Start Working
ScannerDriver : Scanner:LogLevel4 : Working Step1
ScannerDriver : Scanner:LogLevel4 : Working Step2
ScannerDriver : Scanner:LogLevel4 : Working Step3
ScannerDriver : Scanner:LogLevel4 : Working Step4
Application1 : Application1 : LogLevel5 : End Program
PrinterDriver : Printer:LogLevel4 : Wait user operation
ScannerDriver : Scanner:LogLevel2 : Device Connection not found.
ScannerDriver : Scanner:LogLevel1 : Working Failed! Device Parameter cannot read

FATAL ERROR IS OCCURED

FIG.3

CONTENTS OF COLLECTED DATA FILE AREA 13d

```
[Printer]
Version1 = %SYSTEM% ¥spool ¥drivers ¥w32x86¥printer.dll
```

```
[Scanner]
Version1 = %SYSTEM% ¥ Twain_32.dll
```

```
[ Applicarion1 ]
Version1 = %PROGRAM% ¥Vender ¥ start.exe
```

```
[ Application2]
Port = 1
```

FIG.4

CONTENT OF THE ERROR RESOLUTION DATA FILE AREA 13i

| IDENTIFIER | ERROR DESCRIPTION | RELATED DATA | ERROR RESOLUTION DATA |
|---|---|---|---|
| Printer | RECEIVED INK REFILL SIGNAL FROM MULTIFUNCTION DEVICE | REMAINING INK AMOUNT | REPLACE INK CARTRIDGE |
| Printer | CORRUPTED PRINT DATA RECEIVED FROM MULTIFUNCTION DEVICE | PRINTER REGISTRY | EDIT REGISTRY |
| Printer | COULD NOT ESTABLISH USB CONNECTION WITH MULTIFUNCTION DEVICE | PORT NAME AND PRINTER REGISTRY | CORRECT PRINTER PORT NAME |
| Scanner | COULD NOT ESTABLISH USB CONNECTION WITH MULTIFUNCTION DEVICE | VERSION OF FILE A | UPDATE OPERATION SYSTEM |
| Scanner | COULD NOT ESTABLISH LAN CONNECTION WITH MULTIFUNCTION DEVICE | TwainDriver SETTINGS FILE DATA | EDIT SETTINGS FILE |
| Scanner | COULD NOT TRANSFER SCANNED IMAGE DATA TO APPLICATION i | INSTALLATION DATA FOR APPLICATION ii | UNINSTALL APPLICATION ii |
| Scanner | ERROR WAS RECEIVED FROM MULTIFUNCTION DEVICE WHEN ATTEMPTING TO BEGIN SCAN | TwainDriver SETTINGS FILE DATA | EDIT SETTINGS FILE |
| Scanner | COMMUNICATION FAILED BETWEEN APPLICATION iii AND SCANNER DRIVER | VERSION OF TwainDataSource | UPDATE OPERATION SYSTEM |
| Scanner | COMMUNICATION FAILED BETWEEN APPLICATION iv AND SCANNER DRIVER | LANGUAGE DATA FOR EXECUTABLE FILE OF APPLICATION iv AND LANGUAGE DATA FOR TwainDataSource | CHANGE TwainDataSource FILE TO HAVE SAME LANGUAGE AS APPLICATION iv |
| Application1 | FAILED TO START APPLICATION ii | INSTALLATION DATA FOR APPLICATION ii | REINSTALL APPLICATION ii |
| Application1 | FAILED TO START APPLICATION vi | INSTALLATION DATA FOR APPLICATION vi AND VERSION OF SPECIFIED FILE A | ACQUIRE LATEST FILE A FROM MANUFACTURER OF APPLICATION vi |
| Application2 | COULD NOT ACQUIRE REMAINING INK AMOUNT | LIST OF INSTALLED PRINTER DRIVERS | REINSTALL PRINTER DRIVER |

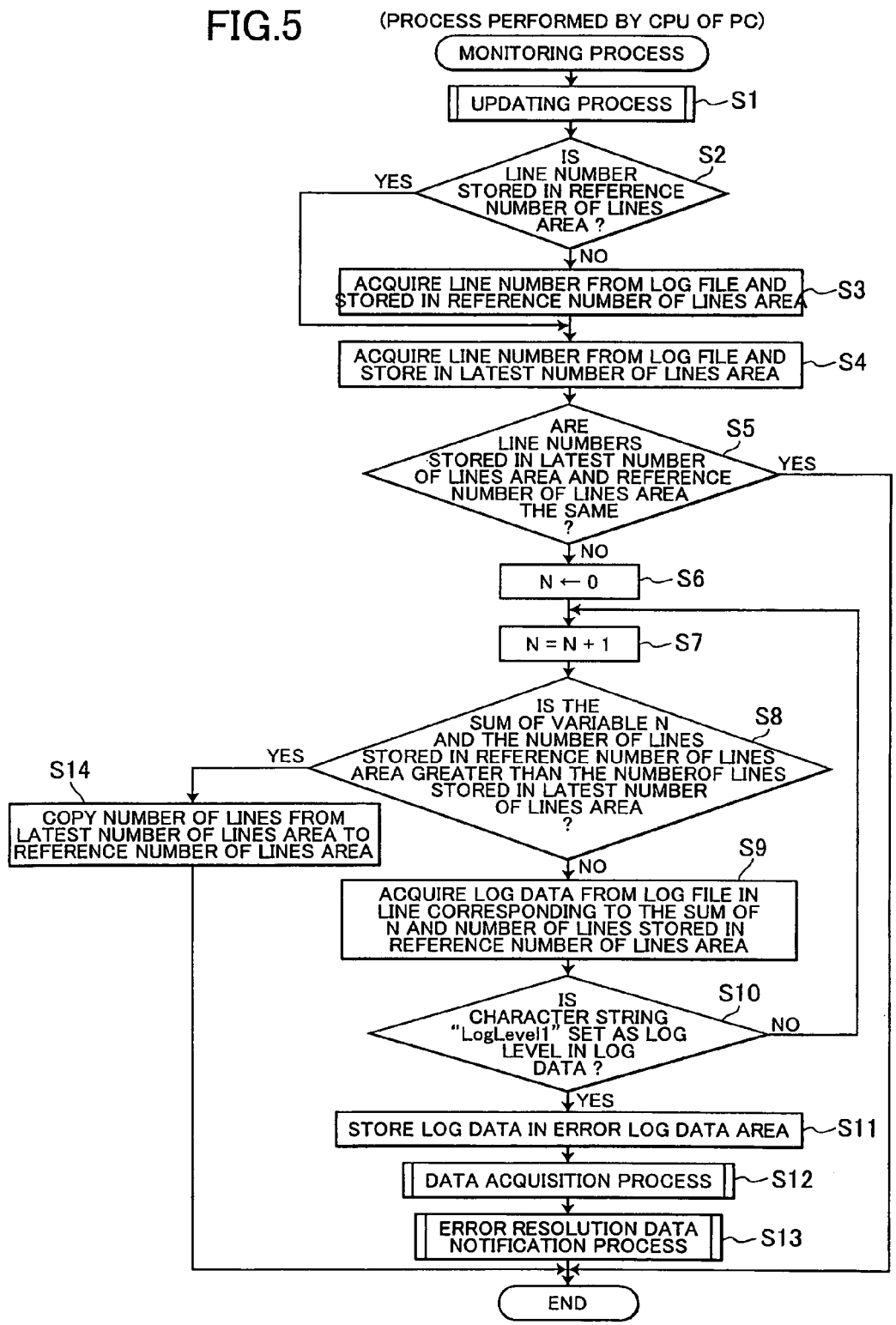

FIG.10

CONTENTS OF LOG FILE AREA 13b

PrinterDriver: Printer

LogLevel3 : Parameter x = 1, y = 2

LogLevel5 : Set Parameter

LogLevel3 : Start Working

LogLevel4 : Working Step1

LogLevel4 : Working Step2

LogLevel4 : Working Step3

LogLevel4 : Working Step4

LogLevel2 : Device Connection not found.

LogLevel1 : Working Failed! Device Parameter cannot read

FATAL ERROR IS OCCURED

DATA PROCESSOR, DATA PROCESSING PROGRAM, AND DATA PROCESSING SYSTEM

CROSS REFERENCE TO RELATED APPLICATION

This application claims priority from Japanese Patent Application No. 2007-144579 filed May 31, 2007. The entire content of the priority application is incorporated herein by reference.

TECHNICAL FIELD

The present invention relates to a data processor, a data processing program, and a data processing system, and more particularly to a data processor, data processing program, and data processing system capable of investigating a cause of an abnormality associated with a control target by acquiring related data for the control target.

BACKGROUND

In a method well known in the art for managing program operation data, such as that disclosed in Japanese Patent Application Publication No. H08-249215, when a fault or other abnormality occurs during program operations for controlling devices, the device used when the abnormality occurred is detected and data required for investigating the cause of the abnormality occurring in the detected device is stored and provided to the user. With a data processor, data processing program, and data processing system employing this method of managing program operation data, data related to the operational environments of programs controlling specific devices is collected and stored in a program data management table of a shared memory. Accordingly, if an abnormality occurs when a program is used to control a specific device, the program data management table can be referenced to quickly retrieve data in order to reduce the time required for investigating the cause of the abnormality.

SUMMARY

However, with the data processor, data processing program, and data processing system employing the conventional method of managing program operational data, the data stored in the program management table is limited to data related to the operational environments of the programs. Here, a computer (data processor) using a plurality of control targets, such as a printer and scanner, or a computer using a multifunction device with a plurality of integrated control targets, such as a printer and scanner, generally employs a plurality of programs for each of the plurality of control targets or functions. When employing a plurality of programs corresponding to the plurality of control targets or functions in this way, the computer cannot acquire data on the control target or function required for resolving the abnormality and cannot investigate the cause of the abnormality associated with the control target or function.

Therefore, it is an object of the present invention to provide a data processor, data processing program, and data processing system capable of investigating the causes of abnormalities associated with control targets by acquiring related data on the control targets.

To achieve the above and other objects, one aspect of the invention provides a data processor including a plurality of control targets, a plurality of controlling units, a related data storing unit, an operation storing unit, an identification data recording unit, an abnormality data recording unit, a data acquiring unit, a related data acquiring unit, a resolution data storing unit, and a resolution data acquiring unit. The plurality of control targets is capable of communicating with each other. The plurality of controlling units is provided to correspond with the plurality of control targets. The related data storing unit stores a plurality of sets of related data related to the plurality of controlling units. The plurality of sets of related data corresponds to the plurality of control targets. The operation storing unit stores operation detail of each of the plurality of controlling units as an operation log when each of the plurality of controlling units operates the corresponding control target. The identification data recording unit records a plurality of sets of identification data in the operation log. Each of the plurality of sets of identification data indicates each of the plurality of the control targets operated by the corresponding controlling unit. Each of the plurality of sets of identification data corresponds to each of the plurality of the control units and to each of the plurality of sets of related data. The abnormality data recording unit records abnormality data in the operation log. The abnormality data indicates that an abnormality has occurred on one of the control targets when the one of the control targets is operated by the corresponding controlling unit. The data acquiring unit acquires the abnormality data recorded in the operation log and one of the identification data recorded in the operation log. The related data acquiring unit identifies one of the related data corresponding to the one of identification data acquired by the data acquiring unit and acquires the one of related data from the related data storing unit. The resolution data storing unit stores first resolution data to resolve the abnormality occurring in the one of the control targets in association with the one of related data acquired by the related data acquiring unit and the abnormality data acquired by the data acquiring unit. The resolution data acquiring unit acquires the first resolution data corresponding to the one of the control targets in which the abnormality occurred using the one of related data acquired by the related data acquiring unit and the abnormality data acquired by the data acquiring unit.

In another aspect of the present invention, there is provided a computer-readable storage medium storing a computer-executable data processing program for a data processor. The data processor includes a plurality of control targets, a plurality of controlling units, a related data storing unit, an operation storing unit, an identification data recording unit, and an abnormality data recording unit. The plurality of control targets is capable of communicating with each other. The plurality of controlling units is provided to correspond with the plurality of control targets. The related data storing unit stores a plurality of sets of related data related to the plurality of controlling units. The plurality of sets of related data corresponds to the plurality of control targets. The operation storing unit stores operation detail of each of the plurality of controlling units as an operation log when each of the plurality of controlling units operates the corresponding control target. The identification data recording unit records a plurality of sets of identification data in the operation log. Each of the plurality of sets of identification data indicates each of the plurality of the control targets operated by the corresponding controlling unit. Each of the plurality of sets of identification data corresponds to each of the plurality of the control units and to each of the plurality of sets of related data. The abnormality data recording unit records abnormality data in the operation log. The abnormality data indicates an abnormality has occurred on one of the control targets when the one of the control targets is operated by the corresponding controlling unit. The data processing program includes:

instructions for acquiring the abnormality data recorded in the operation log and one of the identification data recorded in the operation log;

instructions for identifying one of the related data corresponding to the one of identification data acquired in the abnormality data and the identification data acquiring instructions and acquiring the one of related data from the related data storing unit;

instructions for storing resolution data to resolve the abnormality occurring in the one of the control targets in association with the one of related data acquired in the related data acquiring instructions and the abnormality data acquired in the abnormality data and the identification data acquiring instructions; and instructions for acquiring the resolution data corresponding to the one of the control targets in which the abnormality occurred using the one of related data acquired in the related data acquiring instructions and the abnormality data acquired in the abnormality data and the identification data acquiring instructions.

In another aspect of the present invention, there is provided a data processing system including a plurality of control targets and a data processor capable of communicating with the plurality of control targets. The data processor includes a plurality of controlling units, a related data storing unit, an operation storing unit, an identification data recording unit, an abnormality data recording unit, a data acquiring unit, a related data acquiring unit, a resolution data storing unit, and a resolution data acquiring unit. The plurality of control targets is capable of communicating with each other. The plurality of controlling units is provided to correspond with the plurality of control targets. The related data storing unit stores a plurality of sets of related data related to the plurality of controlling units. The plurality of sets of related data corresponds to the plurality of control targets. The operation storing unit stores operation detail of each of the plurality of controlling units as an operation log when each of the plurality of controlling units operates the corresponding control target. The identification data recording unit records a plurality of sets of identification data in the operation log. Each of the plurality of sets of identification data indicates each of the plurality of the control targets operated by the corresponding controlling unit. Each of the plurality of sets of identification data corresponds to each of the plurality of the control units and to each of the plurality of sets of related data. The abnormality data recording unit records abnormality data in the operation log. The abnormality data indicates that an abnormality has occurred on one of the control targets when the one of the control targets is operated by the corresponding controlling unit. The data acquiring unit acquires the abnormality data recorded in the operation log and one of the identification data recorded in the operation log. The related data acquiring unit identifies one of the related data corresponding to the one of identification data acquired by the data acquiring unit and acquires the one of related data from the related data storing unit. The resolution data storing unit stores first resolution data to resolve the abnormality occurring in the one of the control targets in association with the one of related data acquired by the related data acquiring unit and the abnormality data acquired by the data acquiring unit. The resolution data acquiring unit acquires the first resolution data corresponding to the one of the control targets in which the abnormality occurred using the one of related data acquired by the related data acquiring unit and the abnormality data acquired by the data acquiring unit.

BRIEF DESCRIPTION OF THE DRAWINGS

In the drawings:

FIG. 1 is a block diagram showing the electrical structure of an error monitoring system according to an embodiment of the present invention;

FIG. 2 is an explanatory diagram conceptually illustrating log data recorded in a log file according to the embodiment;

FIG. 3 is an explanatory diagram conceptually showing the content of a collected data file according to the embodiment;

FIG. 4 is an explanatory diagram conceptually illustrating an error resolution data file according to the embodiment;

FIG. 5 is a flowchart illustrating steps in a monitoring process executed on a PC in the embodiment;

FIG. 10 is an explanatory diagram conceptually illustrating log data recorded in a log file in a process performed by a printer driver in the embodiment.

DETAILED DESCRIPTION

Figure 6:
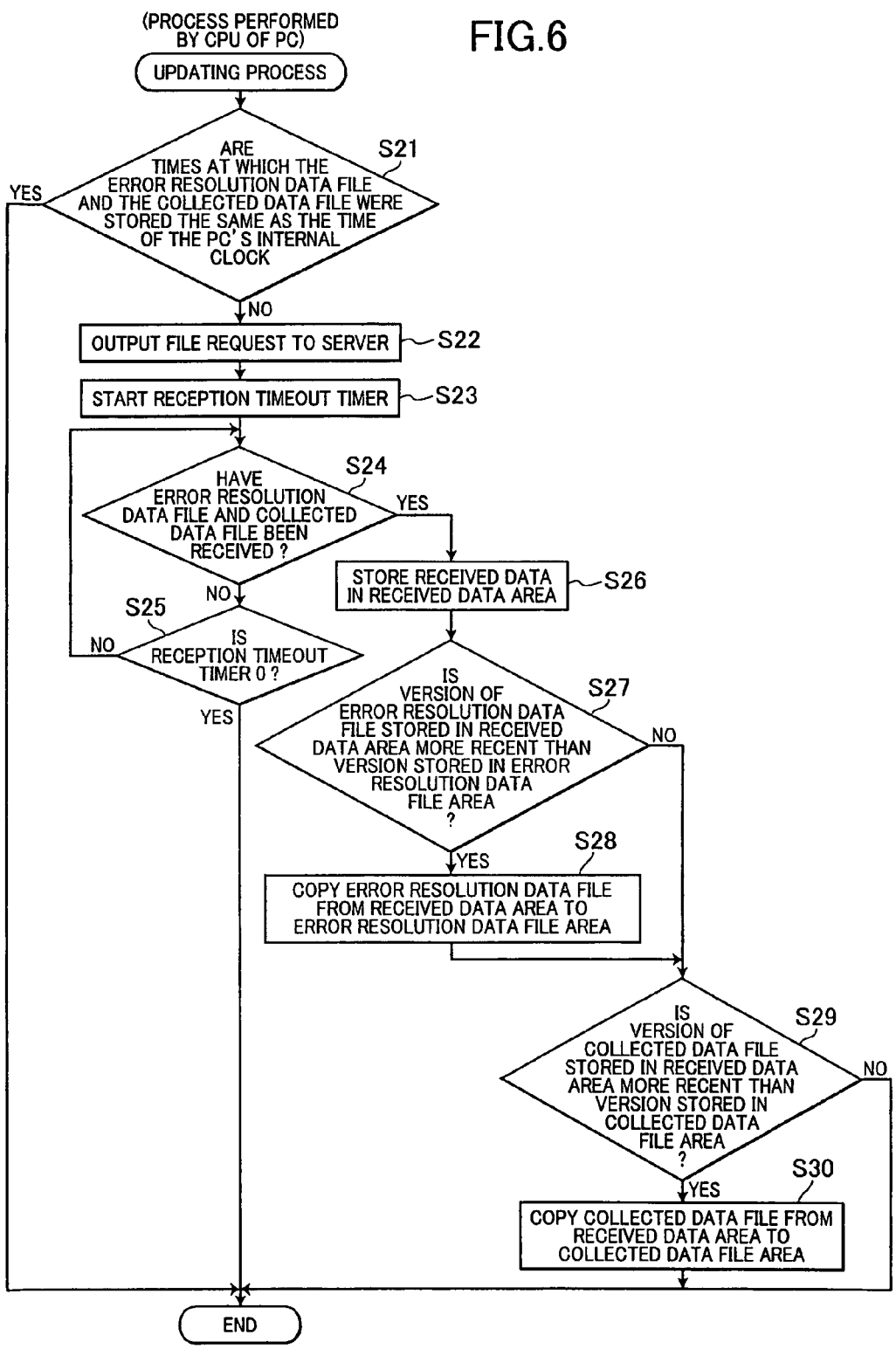
FIG. 6 is a flowchart illustrating steps in an updating process executed on the PC in the embodiment.

Next, a data processor, data processing program, and data processing system according to an embodiment of the present invention will be described while referring to the accompanying drawings. FIG. 1 is a block diagram showing the electrical structure of an error monitoring system 1. The error monitoring system 1 is configured of a personal computer (hereinafter abbreviated as "PC") 10, a multifunction device (hereinafter abbreviated as "MFD") 30, and a server 50. The MFD 30 can communicate with the PC 10 and implements various functions, including a printer function and a scanner function. The server 50 transfers data to the PC 10 based on requests received from the PC 10. First, a description of the PC 10 in FIG. 1 will be given, followed by descriptions of the MFD 30 and the server 50.

The PC 10 outputs commands for controlling operations of the MFD 30 and monitors the process executed on the PC 10 for controlling the MFD 30 to ensure that the process is running properly. The PC 10 also outputs requests to the server 50 and receives data transmitted from the server 50 in response to these requests.

As shown in FIG. 1, the PC 10 includes a CPU 11, a ROM 12, a hard disk drive (hereinafter abbreviated as "HDD") 13, a RAM 14, a keyboard 15, a display 16, an MFD network interface 17, a server network interface 18, and a bus line 19.

The CPU 11 is a microprocessor capable of executing programs stored in the ROM 12. The CPU 11 is connected to the bus line 19. The ROM 12 is a read-only memory storing various programs executed by the CPU 11 (programs illustrated by the flowcharts in FIGS. 5-8, for example), as well as constants and tables that the CPU 11 references when executing the programs. The ROM 12 is also connected to the bus line 19.

The HDD 13 is a rewritable storage device for storing various data and is capable of saving the content when the power is shut off. The HDD 13 is also connected to the bus line 19. The HDD 13 includes an application area 13a, a log file area 13b, a log monitoring program area 13c, a collected data file area 13d, a printer driver data area 13e, a scanner driver data area 13f, a first application data area 13g, a second application data area 13h, and an error resolution data file area 13i.

The application area 13a stores one control program for operating the MFD 30, and another control programs for operating applications installed on the HDD 13. The application area 13a has a printer driver area 13a1, a scanner driver area 13a2, a first application area 13a3, and a second application area 13a4. The printer driver area 13a1 stores a printer driver that functions as a control program for operating a printer 35 of the MFD 30. The scanner driver area 13a2 stores a scanner driver that serves as a control program for operating a scanner 36 of the MFD 30. The first application area 13a3 stores a first application that functions as a control program for operating an editor application (also installed on the HDD 13), which edits image data read by the scanner 36 of the MFD 30. The second application area 13a4 stores a second application that functions as a control program for detecting the state of the printer 35 (for detecting the amount of remaining ink for the printer function of the MFD 30, for example).

The log file area 13b stores a log file including log data that indicates whether the process for operating the MFD 30 is running normally on the PC 10. The CPU 11 records log data in the log file indicating whether the processes for operating the printer 35 and scanner 36 of the MFD 30 are executing normally with the printer driver and scanner driver. The CPU 11 also records log data in the log file indicating whether the editor application installed on the HDD 13 was started properly with the first application. The CPU 11 also records log data in the log file indicating whether the process for detecting the state of the printer 35 was executed normally with the second application. In this way, log data is recorded in the log file for processes in which the CPU 11 controls various control targets using the printer driver, scanner driver, first application, and second application (i.e., operating the printer 35, operating the scanner 36, starting the editor application, and detecting the state of the printer 35). A program for recording log data in the log file is incorporated in each application program.

Next, the log file will be described with reference to FIG. 2. FIG. 2 conceptually illustrates log data recorded in a log file.

In FIG. 2, log data recorded in one line of the log file includes an application name, an identifier, a log level, and operation details for the operation executed by the CPU 11 using the application. The CPU 11 records log data in the log file each time an operation is executed.

The application name is data indicating the name of an application that the CPU 11 uses to execute a user command. In this embodiment, there are four application names corresponding to each of the applications, including PrinterDriver, ScannerDriver, Application1, and Application2.

The identifiers are data indicating the identifiers of each application executed by the CPU 11 and include Printer, Scanner, Application1, and Application2.

The log level is data indicating the severity of an abnormality occurring when the CPU 11 operates a control target using an application (i.e., operating the printer 35, operating the scanner 36, starting the editor application, and detecting the state of the printer 35). Loglevels1-5 are assigned based on the operation details. Loglevel5 indicates that operations with the application ended normally. Loglevels4-2 indicate that operations with the application ended, but an abnormality occurred during operations. Loglevel1 indicates that operations with the application could not be completed because a fatal error occurred requiring some kind of recovery. Correlations between the log levels and operation details are incorporated in each application. For simplification, operation details will be described below as an error description when the log level is "Loglevel1."

For example, as shown in the top line of the log file in FIG. 2, when parameters x and y used by the printer driver for operating the printer 35 of the MFD 30 are set to 1 and 2, respectively, the CPU 11 records the log data "PrinterDriver: Printer: Loglevel3: Parameter x=1, y=2" as one line in the log file when executing a process using the printer driver. In this case, the printer name is "PrinterDriver," the identifier is "Printer," the log level is "Loglevel3," and the operation details are "Parameter x=1, y=2."

The last line in the log file of FIG. 2 shows a case in which an error occurred at Loglevel1. In this case, the CPU 11 records the log data "ScannerDriver: Scanner: Loglevel1: Working Failed! Device Parameter cannot read" in the log file as one line of data. This log data indicates that the CPU 11 attempted to operate the scanner 36 of the MFD 30 with the scanner driver, but could not acquire device parameters required by the scanner driver and, hence, could not complete operations with the scanner 36. Since a fatal error occurred during the scanner driver process in this case, operations of the scanner 36 cannot be completed without performing a recovery operation. In this log data, the application name is "ScannerDriver," the identifier is "Scanner," the log level is "Loglevel1," and the error description is "Working Failed! Device Parameter cannot read."

In this way, the CPU 11 records one line worth of log data in the log file that includes the application name, the identifier, the log level, and the operation details (error description). From the data recorded in the log file, the CPU 11 can detect whether a fatal error occurred during a process for operating a control target using an application. Further, storing the application name, identifier, log level, and operation details (error description) in a single log file makes processes executed by the CPU 11 with an application simpler than when log data is stored in separate log files provided for each application.

The log monitoring program area 13c shown in FIG. 1 stores a log monitoring program that the CPU 11 executes to determine from a log file whether an error occurred and to execute a process to resolve the error. A process performed with the log monitoring program will be described later in detail with reference to FIGS. 5-8.

The collected data file area 13d stores a collected data file from which the CPU 11 can acquire only related data required for resolving a fatal error when the log level is "Loglevel1" for a process performed with an application, i.e., when a fatal error occurred during the application process. If a fatal error occurred during a process, the CPU 11 acquires related data for resolving the fatal error from the printer driver data area 13e, scanner driver data area 13f, first application data area 13g, and second application data area 13h based on the collected data file.

Here, the collected data file stored in the collected data file area 13d will be described with reference to FIG. 3. FIG. 3 conceptually illustrates the contents of the collected data file. While related data required for resolving a fatal error includes both data that the CPU 11 acquires based on the collected data file and data that the CPU 11 acquires based on the log monitoring program, only related data required based on the collected data file will be described here. As shown in FIG. 3, the collected data file stores the four identifiers "Printer," "Scanner," "Application1," and "Application2" and related data required for resolving a fatal error in association with each of the identifiers as a correlation table. Since the collected data file is provided separately from the log monitoring program rather than being incorporated therein, the related data required for resolving a fatal error can be freely added to or deleted from the collected data file, except for related data that the CPU 11 acquires based on the log monitoring program.

The printer driver data area 13e in FIG. 1 stores related data for the printer driver. In this embodiment, the printer driver data area 13e stores at least four types of related data, including a port name for implementing proper communications between the PC 10 and the printer 35 of the MFD 30, a remaining ink amount indicating the amount of ink remaining in the printer 35 of the MFD 30, a printer registry including data related to the system of the printer 35, and version data (see FIG. 3) for the driver "printer.dll" of the printer 35.

The scanner driver data area 13f stores related data for the scanner driver. In this embodiment, the scanner driver data area 13f stores at least five types of related data, including a TWAIN Driver settings file, which is a driver settings file for a scanner 36 supporting TWAIN (Technology Without Any Interested Name); version data for the TWAIN Data Source, which is a conversion application for transferring data to the TWAIN driver of the scanner 36; language data for the TWAIN Data Source indicating the language supported by the TWAIN Data Source; an application list including a list of applications installed on the HDD 13; and version data for "TWAIN_32.dll," which is a system file for the scanner 36.

The first application data area 13g stores related data for the first application. In this embodiment, the first application data area 13g stores at least two types of related data, including an application list storing a list of applications installed on the HDD 13, and version data for "start.exe," which is a program file.

The second application data area 13h stores related data for the second application. In this embodiment, the second application data area 13h stores at least two types of related data, including a printer driver list storing a list of drivers for the printer 35 that have been installed on the HDD 13; and a port name (see FIG. 3) for implementing proper communications between the PC 10 and the printer 35 of the MFD 30.

The error resolution data file area 13i stores an error resolution data file indicating methods for resolving fatal errors that occur when operating each control target. The CPU 11 uses the error resolution data file, log data stored in an error log data area 14d described later for processes in which a fatal error occurred, and related data stored in a collected data area 14e described later to select suitable error resolution data to be displayed on the display 16. Since the error resolution data file correlates log data with related data, for simplification, this file will be described again later after describing the error log data area 14d and collected data area 14e.

The RAM 14 is memory having a work area for temporarily storing variables and the like when the CPU 11 executes programs. The RAM 14 is also connected to the bus line 19. The RAM 14 has a reference number of lines area 14a, a latest number of lines area 14b, a log data area 14c, the error log data area 14d, the collected data area 14e, and a received data area 14f.

The reference number of lines area 14a stores the number of lines in the log file. The number of lines stored in the reference number of lines area 14a is used as a reference number for determining whether new log data has been recorded in the log file. For example, if the log file shown in FIG. 2 is stored in the log file area 13b, the number "11" is recorded as the reference number in the reference number of lines area 14a since the log file has eleven lines.

The latest number of lines area 14b stores the number of lines in the log file after the number of lines has been stored in the reference number of lines area 14a. For example, if the log file has fourteen lines, the number "14" is stored in the reference number of lines area 14a.

The log data area 14c stores one line of log data from the log file stored in the log file area 13b. The CPU 11 determines whether the log level in the line of log data recorded in the log data area 14c is the character string "Loglevel1" indicating that a fatal error has occurred.

The error log data area 14d stores the same line of log data in the log data area 14c when the CPU 11 detects that the log level in the line of log data stored in the log data area 14c is the character string "Loglevel1." Since the log data stored in the error log data area 14d has the same content as the line of log data stored in the log data area 14c, the data includes the application name, identifier, log level "Loglevel1," and error description.

The collected data area 14e stores related data that the CPU 11 acquires based on the collected data stored in the file collected data file 13d, and related data that the CPU 11 acquires based on the log monitoring program stored in the log monitoring program area 13c. Further, since an identifier is assigned to each type of related data stored in the data areas 13e-13h, the collected data area 14e stores each related data in association with an identifier.

Here, the error resolution data file stored in the error resolution data file area 13i will be described with reference to FIG. 4. FIG. 4 conceptually illustrates the contents of the error resolution data file.

As shown in FIG. 4, the error resolution data file includes the identifiers stored in the error log data area 14d, the error description stored in the error log data area 14d, the related data stored in the collected data area 14e, and error resolution data describing how a fatal error can be resolved.

Hence, the error resolution data file stored in the error resolution data file area 13i is configured of sets of data including an identifier, error description, related data, and error resolution data. If the log data stored in the error log data area 14d has "PrinterDriver" as the application name, "Printer" as the identifier, "Loglevel1" as the log level, and "Received an ink refill signal from the MFD 30" as the error description, for example, the CPU 11 selects the error resolution data "Refill ink" indicated by P1 in FIG. 4 from the error resolution data file based on the identifier "Printer" and the error description "Received an ink refill signal from the MFD 30" stored in the error log data area 14d, and the related data "Remaining ink amount" stored in the collected data area 14e and displays this error resolution data on the display 16.

The received data area 14f stores data received from the server 50. The data received from the server 50 may include an error resolution data file, a collected data file, and an error resolution data.

The keyboard 15, display 16, MFD network interface 17, and server network interface 18 are also connected to the bus line 19.

Next, the MFD 30 will be described. The MFD 30 is a multifunction device that operates based on commands outputted from the PC 10.

As shown in FIG. 1, the MFD 30 primarily includes a CPU 31, a ROM 32, a RAM 33, a network interface 34, the printer 35, the scanner 36, a USB terminal 37, an ink sensor 38, operating keys 39, a panel gate array 40, a liquid crystal display (hereinafter abbreviated as "LCD") 41, and a liquid crystal display controller (hereinafter abbreviated as "LCD controller") 42.

The CPU 31, ROM 32, RAM 33, and network interface 34 are each connected to a bus line 43.

The printer 35 functions to print images and the like on recording paper. The scanner 36 functions to scan images printed on recording paper. The USB terminal 37 is used to connect a portable memory device, personal computer, or the like to the MFD 30. The printer 35, scanner 36, and USB terminal 37 are all connected to the bus line 43.

The ink sensor 38 measures the amount of ink remaining in an ink cartridge (not shown) mounted in the MFD 30. The amount of remaining ink measured by the ink sensor 38 is referred to as the remaining ink amount in the following description. The ink sensor 38 is connected to the bus line 43.

The panel gate array 40 controls the operating keys 39 to input desired commands into the MFD 30. The panel gate array 40 is connected both to the operating keys 39 and to the bus line 43. The LCD controller 42 functions to display data and the like related to operations of the printer 35 and scanner 36 on the LCD 41 in response to commands from the CPU 31. The LCD controller 42 is connected both to the LCD 41 and to the bus line 43.

Next, the server 50 will be described. The server 50 is a storage device that receives requests outputted from the PC 10 and transmits data stored in the server 50 to the PC 10 based on the requests. The server 50 has a CPU 51, a ROM 52, a HDD 53, a RAM 54, a network interface 55, a keyboard 56, and a display 57.

The CPU 51 is a microprocessor that executes various programs stored in the ROM 52. The CPU 51 is connected to a bus line 58. The CPU 51 receives requests outputted from the PC 10 via the network interface 55 and transmits data stored in the HDD 53 to the PC 10 via the network interface 55 based on the inputted requests.

Figure 9:
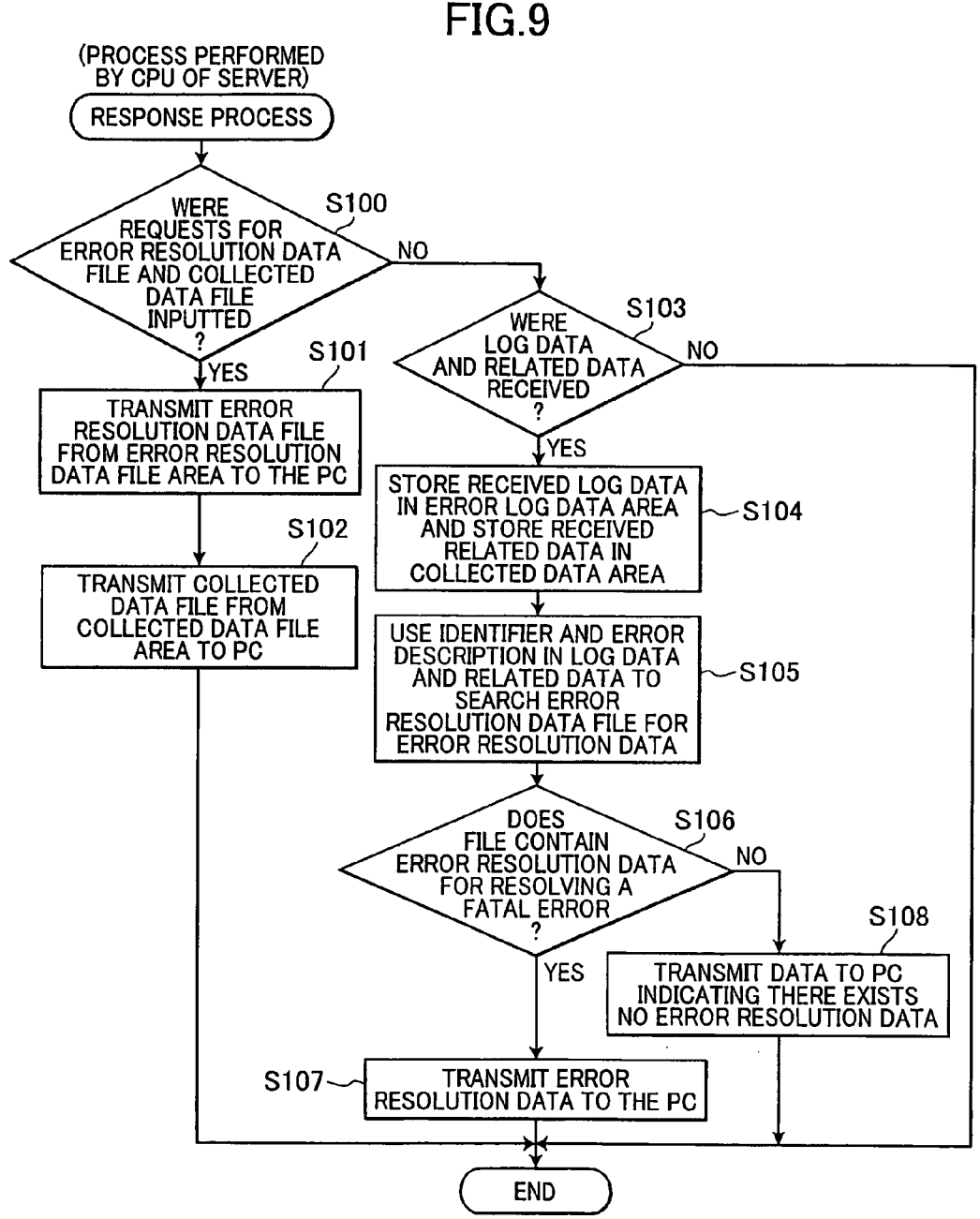
FIG. 9 is a flowchart illustrating steps in a response process executed on a server according to the embodiment.

The ROM 52 is a read-only memory for storing various programs and the like executed by the CPU 51 (such as the program illustrated in the flowchart of FIG. 9). The ROM 52 is also connected to the bus line 58.

The HDD 53 is also connected to the bus line 58 and has a collected data file area 53a, and an error resolution data file area 53b.

The collected data file area 53a stores the same collected data file stored in the collected data file area 13d of the PC 10. However, the collected data file stored in the collected data file area 53a is always the latest version.

The error resolution data file area 53b stores the same error resolution data file stored in the error resolution data file area 13i of the PC 10. However, the error resolution data file stored in the error resolution data file area 53b is always the latest version.

The RAM 54 is memory having a work area for temporarily storing variables and the like when the CPU 51 executes programs. The RAM 54 is also connected to the bus line 58 and has an error log data area 54a, and a collected data area 54b.

The error log data area 54a stores log data that the PC 10 transmits from the error log data area 14d. The collected data area 54b stores related data that the PC 10 transmits from the collected data area 14e.

The network interface 55, keyboard 56, and display 57 are also connected to the bus line 58.

As described above, the error monitoring system 1 is configured of the PC 10, MFD 30, and server 50. The PC 10 executes the log monitoring program stored in the log monitoring program area 13c to monitor processes executed by applications for operating the MFD 30 in order to ensure that the processes are executing normally on the PC 10.

Next, a monitoring process implemented by the CPU 11 of the PC 10 based on the log monitoring program will be described with reference to FIG. 5. FIG. 5 is a flowchart illustrating steps in the monitoring process executed by the CPU 11. The monitoring process is configured of a process for updating the collected data file stored in the collected data file area 13d and the error resolution data file stored in the error resolution data file area 13i, and a process for detecting whether a fatal error has occurred in a process for operating a control target based on the log file stored in the log file area 13b and to display error resolution data on the display 16 for resolving a fatal error.

The monitoring process is executed when the PC 10 is started or when the log monitoring program stored in the log monitoring program area 13c is started after the PC 10 is started. The monitoring program is repeatedly executed at periodic intervals (every 3 seconds in this embodiment).

In S1 of the monitoring process, the CPU 11 performs an updating process. The updating process will be described herewith reference to FIG. 6. FIG. 6 is a flowchart illustrating steps in the updating process executed by the CPU 11. In S21 of the updating process, the CPU 11 determines whether the time at which the error resolution data file was stored in the error resolution data file area 13i and the time at which the collected data file was stored in the collected data file area 13d match the time of the internal clock (not shown) of the PC 10. If the times in which the error resolution data file and the collected data file were stored match the internal clock time of the PC 10 (S21: YES), then the CPU 11 determines that the error resolution data file and the collected data file have been updated and ends the updating process.

However, if the times at which the files were stored do not match the internal clock time of the PC 10 (S21: NO), in S22 the CPU 11 outputs an error resolution data file request and a collected data file request to the server 50 in order to update these files. In S23 the CPU 11 starts a reception timeout timer (not shown) to begin counting down a prescribed time. The reception timeout timer is set to the prescribed time of 1 second in this embodiment.

In S24 the CPU 11 determines whether the error resolution data file and the collected data file have been received. If the files have not been received (S24: NO), in S25 the CPU 11 determines whether the reception timeout timer has reached zero. If the timer value is not zero (S25: NO), indicating that 1 second has not yet elapsed since beginning the countdown, i.e., since transmitting the file requests, then the CPU 11 loops back to S24. However, if the reception timeout timer has reached zero (S25: YES), indicating that 1 second has already elapsed since transmitting the file requests and that the server 50 likely cannot transmit the error resolution data file and the collected data file due to some abnormality on the server 50, then the CPU 11 ends the updating process.

However, if the CPU 11 determines in S24 that the error resolution data file and the collected data file have been received (S24: YES), then in S26 the CPU 11 stores the received data in the received data area 14f. In S27 the CPU 11 determines whether the version of the error resolution data file stored in the received data area 14f is more recent than the version of the file stored in the error resolution data file area 13i. If the version of the file stored in the received data area 14f is more recent (S27: YES), in S28 the CPU 11 copies the error resolution data file from the received data area 14f to the error resolution data file area 13i, overwriting the file in the error resolution data file area 13i with the more recent file. However, if the version of the file stored in the received data area 14f is the same or older than the version of the file stored in the error resolution data file area 13i (S27: NO), the CPU 11 skips S28 since there is no need to overwrite the error resolution data file stored in the error resolution data file area 13i.

In S29 the CPU 11 determines whether the version of the collected data file stored in the received data area 14f is more recent than the version of the collected data file stored in the collected data file area 13d. If the version of the file stored in the received data area 14f is more recent than the version of the file stored in the collected data file area 13d (S29: YES), then in S30 the CPU 11 copies the collected data file from the received data area 14f to the collected data file area 13d, overwriting the older file with the more recent file. Subsequently, the CPU 11 ends the updating process. However, if the version of the file stored in the received data area 14f is the same as or older than the version of the file stored in the collected data file area 13d (S29: NO), then the CPU 11 skips S30 and ends the updating process since there is no need to overwrite the collected data file stored in the collected data file area 13d.

Through this updating process, the CPU 11 updates the collected data file stored in the collected data file area 13d and the error resolution data file stored in the error resolution data file area 13i with the most recent collected data file and most recent error resolution data file stored on the server 50. By updating the collected data file stored in the collected data file area 13d to the most recent collected data file, the CPU 11 can modify the related data acquired based on each application.

Returning to FIG. 5, in S2 the CPU 11 determines whether the number of lines is stored in the reference number of lines area 14a. If the number of lines is not stored in the reference number of lines area 14a (S2: NO), then in S3 the CPU 11 acquires the number of lines from the log file stored in the log file area 13b and stores the number of lines in the reference number of lines area 14a. In this way, the reference number of lines can be stored in the reference number of lines area 14a, enabling the CPU 11 to determine whether new log data has been recorded in the log file. However, if the number of lines is already stored in the reference number of lines area 14a (S2: YES), then the CPU 11 skips S3 since there is no need to determine whether new log data has been recorded in the log file.

In S4 the CPU 11 acquires the number of lines from the log file and stores this number of lines in the latest number of lines area 14b. In S5 the CPU 11 determines whether the number of lines stored in the latest number of lines area 14b is the same as the number of lines stored in the reference number of lines area 14a. If the numbers of lines in the reference number of lines area 14a and latest number of lines area 14b match (S5: YES), then the CPU 11 ends the monitoring process since new log data has not been recorded in the log file.

However, if the numbers of lines in the reference number of lines area 14a and latest number of lines area 14b do not match (S5: NO), indicating that new line data has been recorded in the log file, then in S6 the CPU 11 sets a variable N to 0 as a reference for analyzing newly recorded log data, and in S7 increments the variable N by 1. In S8 the CPU 11 determines whether the sum of the variable N and the number of lines stored in the reference number of lines area 14a is greater than the number of lines stored in the latest number of lines area 14b.

If the sum of the variable N and the number of lines stored in the reference number of lines area 14a is greater than the number of lines stored in the latest number of lines area 14b (S8: YES), indicating that all log data newly recorded in the log file has been analyzed, in S14 the CPU 11 stores the number of lines from the latest number of lines area 14b in the reference number of lines area 14a, thereby updating the number of lines in the reference number of lines area 14a to the number of lines of the latest log file. Subsequently, the CPU 11 ends the monitoring process.

However, if the sum of the variable N and the number of lines stored in the reference number of lines area 14a is the same as or smaller than the number of lines stored in the latest number of lines area 14b (S8: NO), then analysis has not yet been completed for all log data newly recorded in the log file. Accordingly, in S9 the CPU 11 acquires log data from the log file stored in the log file area 13b corresponding to the sum of the variable N and the number of lines stored in the reference number of lines area 14a in order to analyze the next line of log data newly recorded in the log file, and stores this log data in the log data area 14c.

In S10 the CPU 11 determines whether the character string "Loglevel1" is set as the log level in the log data stored in the log data area 14c. If the log level of the log data stored in the log data area 14c is not the character string "Loglevel1" (S10: NO), indicating that a fatal error did not occur in a process for operating the control target, then the CPU 11 returns to S7 in order to analyze other newly recorded log data.

However, if the log level of the log data stored in the log data area 14c is the character string "Loglevel1" (S10: YES), then a fatal error has occurred in the process for operating the control target. Accordingly, in S11 the CPU 11 stores the log data from the log data area 14c in the error log data area 14d as preparation for identifying the application used in the process in which the fatal error occurred. Subsequently, the CPU 11 performs a data acquisition process in S12 for acquiring related data required in analyzing the fatal error and for storing this related data in the collected data area 14e.

Figure 7:
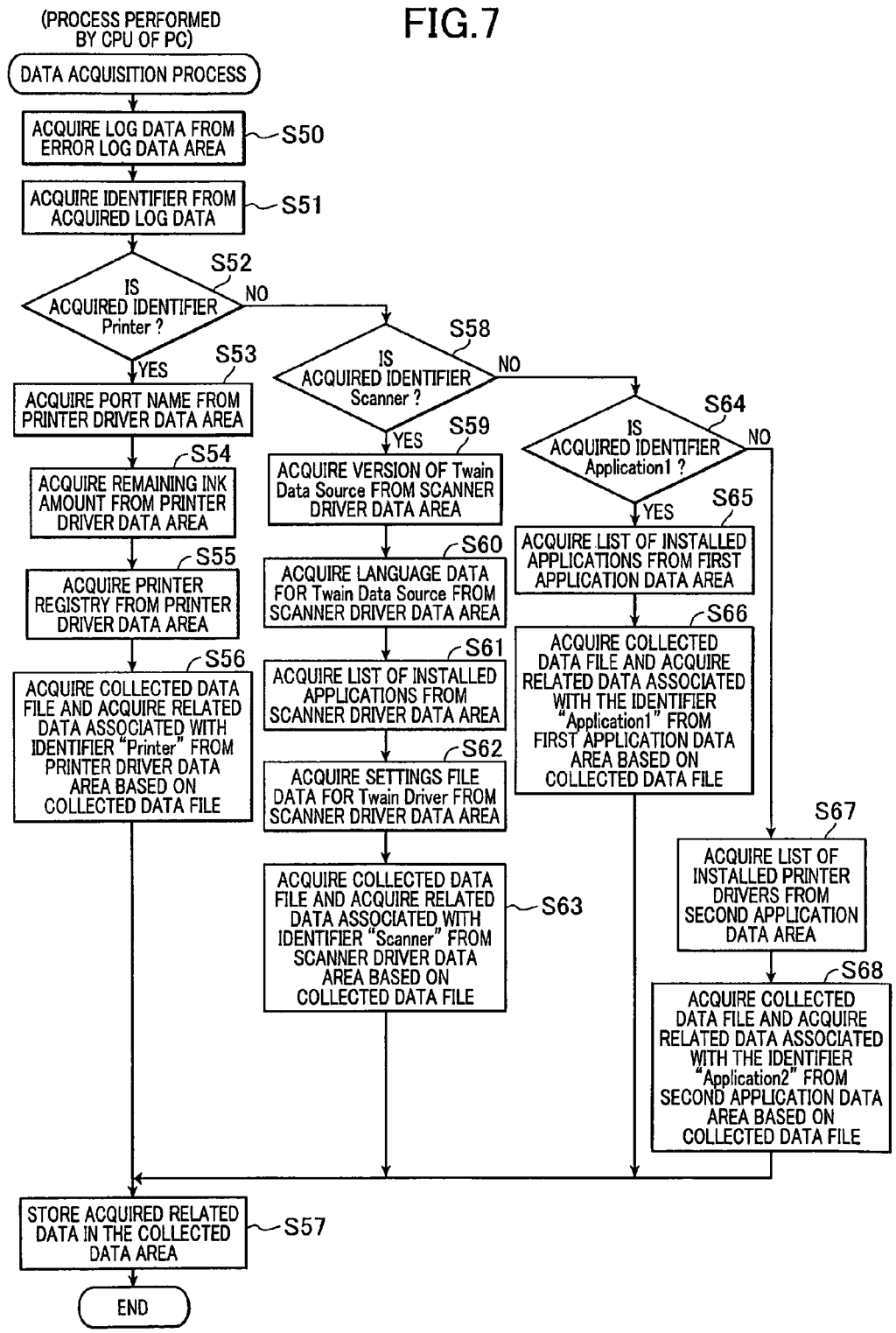
FIG. 7 is a flowchart illustrating steps in a data acquisition process executed on the PC in the embodiment.

The data acquisition process (S12) executed by the CPU 11 of the PC 10 will be described next with reference to FIG. 7. FIG. 7 is a flowchart illustrating steps in the data acquisition process. In S50 at the beginning of the data acquisition process, the CPU 11 acquires log data from the error log data area 14d. In S51 the CPU 11 acquires an identifier (the second column in FIG. 2) from the log data indicating the application used for the process in which the fatal error occurred.

In S52 the CPU 11 determines whether the acquired identifier is "Printer." If the identifier is "Printer" (S52: YES), then in S53-S55 the CPU 11 sequentially acquires the port name, remaining ink amount, and printer registry data from the printer driver data area 13e as related data. In S56 the CPU 11 acquires the collected data file stored in the collected data file area 13d and acquires the related data "Version1=%SYSTEM%¥spool¥drivers¥w32x86¥printer.dll (version 1 data for printer.dll)" (see FIG. 3) corresponding to the identifier "Printer" from the printer driver data area 13e based on the acquired collected data file. In S57 the CPU 11 stores the acquired related data in the collected data area 14e and ends the data acquisition process.

However, if the acquired identifier is not "Printer" (S52: NO), then in S58 the CPU 11 determines whether the acquired identifier is "Scanner." If the identifier is "Scanner" (S58: YES), then in S59-S62 the CPU 11 sequentially acquires related data from the scanner driver data area 13f, including version data for the TWAIN Data Source, language data for TWAIN Data Source, a list of installed applications, and settings file data for TWAIN Driver. In S63 the CPU 11 acquires the collected data file from the collected data file area 13d and acquires the related data "Version1=%SYSTEM%¥Twain_32.dll (version 1 data for Twain_32.dll)" (see FIG. 3) corresponding to the identifier "Scanner" from the scanner driver data area 13f based on the acquired collected data file. In S57 the CPU 11 stores the acquired related data in the collected data area 14e and subsequently ends the data acquisition process.

However, if the identifier is not "Scanner" (S58: NO), then in S64 the CPU 11 determines whether the acquired identifier is "Application1." If the identifier is "Application1" (S64: YES), then in S65 the CPU 11 acquires the list of installed applications on the HDD 13 from the first application data area 13g as the related data. In S66 the CPU 11 acquires the collected data file from the collected data file area 13d and acquires the related data "Version1=%PROGRAM%¥Vendor¥start.exe (version 1 data for start.exe)" (see FIG. 3) corresponding to the identifier "Application1" from the first application data area 13g based on the acquired collected data file. In S57 the CPU 11 stores the acquired related data in the collected data area 14e, and subsequently ends the data acquisition process.

However, if the acquired identifier is not "Application1" (S64: NO), then the acquired identifier is "Application2." Therefore, in S67 the CPU 11 acquires a list of installed printer drivers from the second application data area 13h as the related data. In S68 the CPU 11 acquires the collected data file from the collected data file area 13d and acquires the related data "Port=1 (port name)" (see FIG. 3) corresponding to the identifier "Application2" from the second application data area 13h based on the acquired collected data file. In S57 the CPU 11 stores the acquired related data in the collected data area 14e, and subsequently ends the data acquisition process.

Through the data acquisition process described above, the CPU 11 can acquire an identifier from the log file to identify the application used when the fatal error occurred, and can acquire only the related data required for recovering from the fatal error from the data areas 13e-13h based on the identified application. Since each application operates only one corresponding control target, identifying the application essentially identifies the control target.

After completing the data acquisition process of S12 in FIG. 5, the CPU 11 executes the error resolution data notification process of S13. This process uses the identifier and error description (see FIG. 2) from the log data stored in the error log data area 14d and the related data stored in the collected data area 14e (see FIG. 2) to select error resolution data from the error resolution data file (see FIG. 4) suited to resolving the error and to display the selected error resolution data on the display 16.

Figure 8:
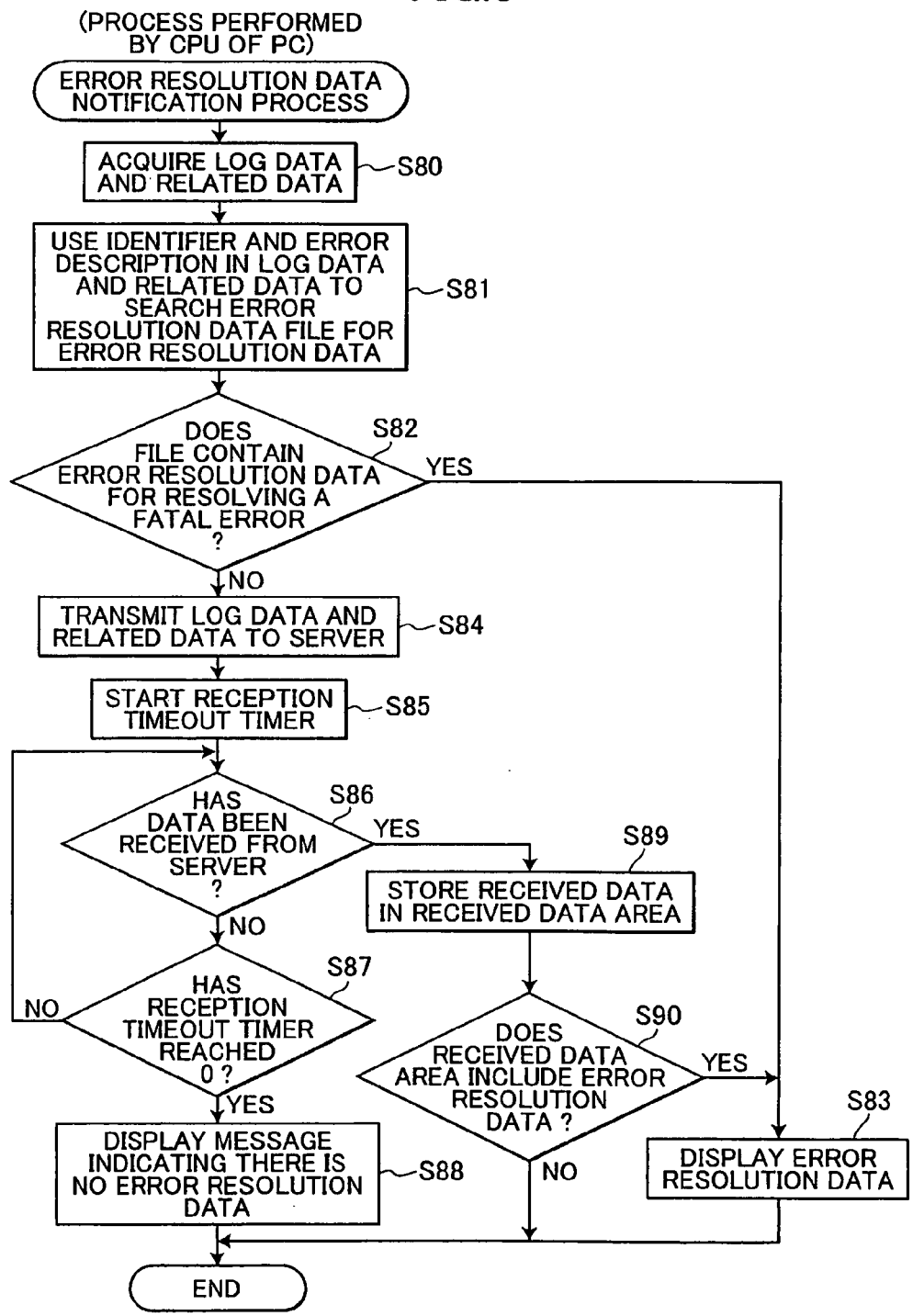
FIG. 8 is a flowchart illustrating steps in an error resolution data notification process executed on the PC in the embodiment.

The error resolution data notification process of S13 executed by the CPU 11 of the PC 10 will be described next with reference to FIG. 8. FIG. 8 is a flowchart illustrating steps in the error resolution data notification process. In S80 of the error resolution data notification process, the CPU 11 acquires the log data stored in the error log data area 14d and the related data stored in the collected data area 14e. In S81 the CPU 11 searches the error resolution data file stored in the error resolution data file area 13i using the identifier and error description acquired from the log data and the acquired related data to determine the existence of error resolution data for resolving the fatal error.

In S82 the CPU 11 determines whether there exists error resolution data for resolving the fatal error that occurred. If such error resolution data exists (S82: YES), in S83 the CPU 11 displays the error resolution data on the display 16 and subsequently ends the error resolution data notification process. However, if such error resolution data does not exist (S82: NO), then in S84 the CPU 11 transmits the log data stored in the error log data area 14d and the related data stored in the collected data area 14e to the server 50 in order to retrieve error resolution data for resolving the fatal error from the latest error resolution data file stored in the error resolution data file area 53b of the server 50. In S85 the CPU 11 starts the reception timeout timer (not shown) to begin counting down a prescribed time. The reception timeout time is set to a prescribed time of 1 second in this embodiment.

In S86 the CPU 11 determines whether data has been received from the server 50. If data has not been received from the server 50 (S86: NO), in S87 the CPU 11 determines whether the reception timeout time has reached zero. If the reception timeout time has not reached zero (S87: NO), indicating that 1 second has not yet elapsed since the timer was started, i.e., since the log data and related data were transmitted to the server 50, then the CPU 11 returns to S86. However, if the reception timeout timer has reached zero (S87: YES), indicating that 1 second has elapsed since the log data and related data were transmitted to the server 50 while error resolution data was not received from the server 50, in S88 the CPU 11 displays a message on the display 16 indicating there is no error resolution data, and subsequently ends the error resolution data notification process.

However, if data has been received from the server 50 (S86: YES), in S89 the CPU 11 stores the received data in the received data area 14f. In S90 the CPU 11 determines whether error resolution data is stored in the received data area 14f. If such data is stored in the received data area 14f (S90: YES), in S83 the CPU 11 displays the error resolution data on the display 16, and subsequently ends the error resolution data notification process. However, if error resolution data is not stored in the received data area 14f (S90: NO), then in S88 the CPU 11 displays a message on the display 16 indicating that there is not error resolution data for resolving the fatal error, and subsequently ends the error resolution data notification process.

Through the error resolution data notification process described above, the CPU 11 uses the identifier and error description in the log data stored in the error log data area 14d and the related data stored in the collected data area 14e (see FIG. 2) to search the error resolution data file stored in the error resolution data file area 13i for data capable of resolving the fatal error, and to display the retrieved error resolution data on the display 16. If the CPU 11 cannot find data for resolving the fatal error that occurred from the error resolution data file stored in the error resolution data file area 13i, the CPU 11 transmits the log data stored in the error log data area 14d and the related data stored in the collected data area 14e to the server 50 to retrieve error resolution data from the latest error resolution data file stored in the error resolution data file area 53b of the server 50.

Accordingly, when a fatal error occurs in a process for operating a control target, the CPU 11 uses both the error resolution data file stored in the error resolution data file area 13i and the latest error resolution data file stored in the error resolution data file area 53b of the server 50 to retrieve data required to resolve the fatal error. Since the retrieved error resolution data corresponds to the control target, the user can investigate the cause of the error corresponding to the control target. Further, since the error resolution data required for resolving the fatal error is displayed on the display 16, the user can investigate the cause of the fatal error occurring during an operation of the control target based on the error resolution data displayed on the display 16.

Further, execution of the data acquisition process in S12 and the error resolution data notification process in S13 is limited to the case in which the log level in the log data stored in the log data area 14c is "Loglevel1." Hence, the PC 10 can only execute these processes when a fatal error requiring some kind of recovery operation occurs.

Next, a response process executed by the CPU 51 of the server 50 will be described with reference to FIG. 9. FIG. 9 is a flowchart illustrating steps in the response process. The response process is configured of a process for transmitting the latest error resolution data file and the latest collected data file to the PC 10, and a process for transmitting error resolution data for resolving a fatal error to the PC 10 when such error resolution data is stored in the error resolution data file area 53b. The CPU 51 executes this response process when the server 50 is started. The response process is repeatedly executed at periodical intervals (every 3 seconds in this embodiment).

In S100 of the response process, the CPU 51 determines whether requests have been inputted for the error resolution data file and the collected data file (S22 in FIG. 6). If requests for these files have been inputted (S100: YES), in S101 the CPU 51 transmits the error resolution data file stored in the error resolution data file area 53b to the PC 10 and in S101 transmits the collected data file stored in the collected data file area 53a to the PC 10. Subsequently, the CPU 51 ends the response process.

However, if requests for the error resolution data file and the collected data file have not been inputted (S100: NO), then in S103 the CPU 51 determines whether log data and related data have been received. If log data and related data have not been received (S103: NO), the CPU 51 ends the response process. However, if log data and related data have been received (S103: YES), then in S104 the CPU 51 stores the received log data in the error log data area 54a and the received related data in the collected data area 54b.

In S105 the CPU 51 uses the identifier and error description in the log data stored in the error log data area 54a and the related data stored in the collected data area 54b to search the error resolution data file stored in the error resolution data file area 53b for error resolution data need to resolve the fatal error.

In S106 the CPU 51 determines whether error resolution data for resolving a fatal error was found. If such error resolution data exists (S106: YES), in S107 the CPU 51 transmits the error resolution data to the PC 10 and subsequently ends the response process. However, if such error resolution data does not exist (S106: NO), then in S108 the CPU 51 transmits data to the PC 10 indicating that there exists no error resolution data for resolving the fatal error, and subsequently ends the response process.

Through this response process, the CPU 51 transmits the latest error resolution data file stored in the error resolution data file area 53b and the latest collected data file stored in the collected data file area 53a to the PC 10 when requests for such files have been inputted. Further, if log data and related data are received, the CPU 51 uses the identifier and error description in the received log data and the received related data to search the error resolution data file stored in the error resolution data file area 53b to determine the existence of error resolution data needed to resolve a fatal error. The CPU 51 transmits this error resolution data to the PC 10 if such data exists.

With the error monitoring system 1 according to the embodiment described above, the PC 10 can acquire an identifier from a log file stored in the log file area 13b to identify an application used for a process in which a fatal error occurred (printer driver, scanner driver, first application, or second application), and can acquire related data from the data areas 13e-13h required for resolving this fatal error based on the identified application, i.e., the control target.

The PC 10 can also retrieve error resolution data needed to resolve the fatal error using acquired related data and an identifier and error description recorded in log data stored in the error log data area 54a. Since the retrieved error resolution data corresponds to a specific control target, the user can investigate the cause of an error in the control target.

Generally, applications for controlling the MFD 30 and an editor application installed on the PC 10, and a log monitoring program are integrally configured as one program. However, in the error monitoring system 1 of the embodiment, the applications and log monitoring program are configured as separate programs on the PC 10, thereby eliminating the need to modify each application when the log monitoring program is modified. Hence, this configuration requires less manpower to modify the log monitoring program than when modifying a log monitoring program configured integrally with each application.

Further, since individual applications on the PC 10 can operate separate control targets (i.e., operating the printer 35, operating the scanner 36, starting the editor application, and detecting the state of the printer 35), if a fatal error occurs during a process with the scanner driver for operating the scanner 36, for example, the CPU 11 can still execute a process with another application.

While the invention has been described in detail with reference to specific embodiments thereof, it would be apparent to those skilled in the art that many modifications and variations may be made therein without departing from the spirit of the invention, the scope of which is defined by the attached claims.

The embodiment describes the MFD 30 that implements functions of a plurality of control targets by incorporating the control targets (printer 35, scanner 36, and the like) in a single package as an example of a plurality of control targets capable of communicating with the PC 10, but the present invention is not limited to this example. Individual functions such as the printer 35 and scanner 36 may be incorporated in individual cases, and each case may be configured to communicate with the PC 10 as a control target. Further, a MFD 30 having separate hardware for implementing individual functions such as the printer 35 and scanner 36, which hardware is electrically interconnected and incorporated in a single package, may be configured to communicate with the PC 10.

In the error monitoring system 1 of the embodiment described above, log data obtained when individual applications (printer driver, scanner driver, first application, and second application) control the control targets (i.e., operating the printer 35, operating the scanner 36, starting the editor application, and detecting the state of the printer 35) is recorded in a single log file in the log file area 13b. However, four separate log files corresponding to the four applications may be provided in the log file area 13b so that log data can be recorded in the corresponding log file for each application.

Here, a log file corresponding to an application will be described for this configuration with reference to FIG. 10. FIG. 10 conceptually illustrates log data recorded in a log file during a printer driver process. Log data recorded in log files during a scanner driver process, first application process, and second application process has an identical configuration to the log data recorded in the printer driver process and will not be described here.

In the log file stored in the log file area 13b, the CPU 11 prerecords the application name and identifier only in the topmost line and records the log level and operation details together in subsequent lines. The CPU 11 records this log data in the log file each time an operation is performed.

For example, if a "Loglevel1" error occurred, as indicated in the bottommost line in the log file of FIG. 10, the CPU 11 records the log data "Loglevel1: Working failed! Device Parameter cannot read." as one line in the log file. In this example, the CPU 11 attempted to operate the printer 35 of the MFD 30 using the printer driver but could not complete the operation because device parameters used by the printer driver could not be acquired. Here, the log level is "Loglevel1" and the error description is "Working failed! Device Parameter cannot read."

In this example, the application name and identifier are prerecorded in each of the four log files corresponding to the applications stored in the log file area 13b, while the CPU 11 records the log level and operation details (error description) together in subsequent lines of log data. By providing four log files corresponding to the four applications and reducing the amount of data recorded in each log file from four items in the log file shown in FIG. 2 (application name, identifier, log level, and operation details) to two items (log level and operation details), the CPU 11 can record log data for a scanner driver process in the log file corresponding to the scanner driver and log data for a printer driver process in the log file corresponding to the printer driver, for example. Hence, the CPU 11 can perform processes to perform log data and log files more quickly than when log data for processes executed by each application are recorded in a single log file.

What is claimed is:

1. A data processor comprising:
   a plurality of control targets capable of communicating with each other;
   a plurality of controlling units provided to correspond with the plurality of control targets;
   a related data storing unit that stores a plurality of sets of related data related to the plurality of controlling units, the plurality of sets of related data corresponding to the plurality of control targets;
   an operation storing unit that stores operation detail of each of the plurality of controlling units as an operation log when each of the plurality of controlling units operates the corresponding control target;
   an identification data recording unit that records a plurality of sets of identification data in the operation log, each of the plurality of sets of identification data indicating each of the plurality of the control targets operated by the corresponding controlling unit, whereby each of the plurality of sets of identification data corresponds to each of the plurality of the control units and to each of the plurality of sets of related data;
   an abnormality data recording unit that records abnormality data in the operation log, the abnormality data indicating that an abnormality has occurred on one of the control targets when the one of the control targets is operated by the corresponding controlling unit;
   a data acquiring unit that acquires the abnormality data recorded in the operation log and one of the identification data recorded in the operation log;
   a related data acquiring unit that identifies one of the related data corresponding to the one of the identification data acquired by the data acquiring unit and that acquires the one of the related data from the related data storing unit;
   a correlation table storing unit that stores a first correlation table correlating the one of the related data acquired by the related data acquiring unit with the one of the identification data recorded in the operation log by the identification data recording unit, wherein the related data acquiring unit acquires, using the first correlation table and the one of the identification data acquired by the data acquiring unit, the one of the related data from the related data storing unit for resolving the abnormality that occurred in the one control target;
   a resolution data storing unit that stores first resolution data to resolve the abnormality occurring in the one of the control targets in association with the one of related data acquired by the related data acquiring unit and the abnormality data acquired by the data acquiring unit;
   a resolution data acquiring unit that acquires the first resolution data corresponding to the one of the control targets in which the abnormality occurred using the one of related data acquired by the related data acquiring unit and the abnormality data acquired by the data acquiring unit; and
   a correction table modifying unit configured to modify the first correlation table.

2. A data processor comprising:
   a plurality of control targets capable of communicating with each other;
   a plurality of controlling units provided to correspond with the plurality of control targets;
   a related data storing unit that stores a plurality of sets of related data related to the plurality of controlling units, the plurality of sets of related data corresponding to the plurality of control targets;
   an operation storing unit that stores operation detail of each of the plurality of controlling units as an operation log when each of the plurality of controlling units operates the corresponding control target;
   an identification data recording unit that records a plurality of sets of identification data in the operation log, each of the plurality of sets of identification data indicating each of the plurality of the control targets operated by the corresponding controlling unit, whereby each of the plurality of sets of identification data corresponds to each of the plurality of the control units and to each of the plurality of sets of related data;
   an abnormality data recording unit that records abnormality data in the operation log, the abnormality data indicating that an abnormality has occurred on one of the control targets when the one of the control targets is operated by the corresponding controlling unit,
   a data acquiring unit that acquires the abnormality data recorded in the operation log and one of the identification data recorded in the operation log,
   a related data acquiring unit that identifies one of the related data corresponding to the one of the identification data acquired by the data acquiring unit and that acquires the one of the related data from the related data storing unit;
   a correlation table storing unit that stores a first correlation table correlating the one of the related data acquired by the related data acquiring unit with the one of the identification data recorded in the operation log by the identification data recording unit, wherein the related data acquiring unit acquires, using the first correlation table and the one of the identification data acquired by the data acquiring unit, the one of the related data from the related data storing unit for resolving the abnormality that occurred in the one control target;
   a resolution data storing unit that stores first resolution data to resolve the abnormality occurring in the one of the control targets in association with the one of related data acquired by the related data acquiring unit and the abnormality data acquired by the data acquiring unit; and
   a resolution data acquiring unit that acquires the first resolution data corresponding to the one of the control targets in which the abnormality occurred using the one of related data acquired by the related data acquiring unit and the abnormality data acquired by the data acquiring unit, wherein the correlation table stored in the correlation table storing unit is rewritable; and the data processor further comprising:

a receiving unit that receives a second correlation table stored from an external storage device; and a correlation table rewriting unit that rewrites the first correlation table to the second correlation table received by the receiving unit.

3. The data processor according to claim 2, further comprising:

a data transmitting unit that transmits the one of related data acquired by the related data acquiring unit and the abnormality data acquired by the data acquiring unit to the external storage device; and a resolution data receiving unit that receives second resolution data for the one of control targets in which the abnormality has occurred when the second resolution data is transmitted from the storage device based on the one of related data and the abnormality data transmitted by the data transmitting unit;

wherein the resolution data acquiring unit acquires the second resolution data received by the resolution data receiving unit.

4. The data processor according to claim 1, further comprising an abnormality detecting unit that acquires the abnormality data recorded in the operation log by the abnormality data recording unit, and the abnormality detecting unit detecting, based on the acquired abnormality data, that the abnormality indicating the controlling unit cannot continue an operation has occurred on the one of control targets;

wherein the resolution data acquiring unit acquires the first resolution data from the resolution data storing unit corresponding to the one of control targets in which the abnormality, indicating the controlling unit cannot continue an operation, has occurred when the abnormality detecting unit detects an occurrence of the abnormality in the one of control target.

5. The data processor according to claim 1, further comprising a displaying unit that displays the first resolution data acquired by the resolution data acquiring unit.

6. The data processor according to claim 1, wherein the plurality of control targets is configured of a multifunction device incorporating the plurality of control targets in a single case; and wherein the plurality of controlling unit have a one-on-one correspondence to the plurality of control targets incorporated in the multifunction device, each of the plurality of controlling units individually operating one of the control targets.

7. The data processor according to claim 1, wherein the operation storing unit stores, as the operation logs, the operation details performed by the plurality of controlling unit in a single operation log file when the plurality of controlling units operate the plurality of control targets, wherein the identification data recording unit records each of the plurality of sets of identification data in the single operation log file in association with each of the operation details, and wherein the abnormality data recording unit records the abnormality data in the single operation log file in association with the one of identification data indicating the one of control targets in which the abnormality has occurred.

8. The data processor according to claim 1, wherein the operation storing unit stores, as each of the operation logs, each of the operation details in each of a plurality of operation log files, each of the plurality of operation log files corresponding to each of the plurality of control targets and to each of the plurality of sets of identification data, wherein each of the plurality of sets of identification data is recorded in the corresponding operation log file by the identification data recording unit, the operation storing unit storing each of the operation details in each of the plurality of operation log files based on the each of the plurality of sets of identification data, and wherein the abnormality data recording unit records the abnormality data in one of the operation log files based on the one of identification data indicating the one of control targets in which the abnormality has occurred.

9. A computer-readable storage medium storing a computer-executable data processing program for a data processor, the data processor comprising a plurality of control targets capable of communicating with each other; a plurality of controlling units provided to correspond with the plurality of control targets; a related data storing unit that stores a plurality of sets of related data related to the plurality of controlling units, the plurality of sets of related data corresponding to the plurality of control targets; an operation storing unit that stores operation detail of each of the plurality of controlling units as an operation log when each of the plurality of controlling units operates the corresponding control target; an identification data recording unit that records a plurality of sets of identification data in the operation log, each of the plurality of sets of identification data indicating each of the plurality of the control targets operated by the corresponding controlling unit, whereby each of the plurality of sets of identification data corresponds to each of the plurality of the control units and to each of the plurality of sets of related data; and an abnormality data recording unit that records abnormality data in the operation log, the abnormality data indicating that an abnormality has occurred on one of the control targets when the one of the control targets is operated by the corresponding controlling unit, the data processing program comprising:

instructions for acquiring the abnormality data recorded in the operation log and one of the identification data recorded in the operation log;

instructions for identifying one of the related data corresponding to the one of the identification data acquired in the abnormality data and the identification data acquiring instructions and acquiring the one of the related data from the related data storing unit;

instructions for storing a correlation table correlating the one of the related data with the one of the identification data recorded in the operation log, wherein by using the correlation table and the one of the identification data, the one of the related data is acquired from the related data storing unit for resolving the abnormality that occurred in the one control target;

instructions for storing resolution data to resolve the abnormality occurring in the one of the control targets in association with the one of related data acquired in the related data acquiring instructions and the abnormality data acquired in the abnormality data and the identification data acquiring instructions;

instructions for acquiring the resolution data corresponding to the one of the control targets in which the abnormality occurred using the one of related data acquired in the related data acquiring instructions and the abnormality data acquired in the abnormality data and the identification data acquiring instructions; and
instructions for modifying the correlation table.

10. A data processing system comprising:
a plurality of control targets; and
a data processor capable of communicating with the plurality of control targets, the data processor comprising:
a plurality of controlling units provided to correspond with the plurality of control targets;
a related data storing unit that stores a plurality of sets of related data related to the plurality of controlling units, the plurality of sets of related data corresponding to the plurality of control targets;
an operation storing unit that stores operation detail of each of the plurality of controlling units as an operation log when each of the plurality of controlling units operates the corresponding control target;
an identification data recording unit that records a plurality of sets of identification data in the operation log, each of the plurality of sets of identification data indicating each of the plurality of the control targets operated by the corresponding controlling unit, whereby each of the plurality of sets of identification data corresponds to each of the plurality of the control units and to each of the plurality of sets of related data;
an abnormality data recording unit that records abnormality data in the operation log, the abnormality data indicating that an abnormality has occurred on one of the control targets when the one of the control targets is operated by the corresponding controlling unit;
a data acquiring unit that acquires the abnormality data recorded in the operation log and one of the identification data recorded in the operation log;
a related data acquiring unit that identifies one of the related data corresponding to the one of the identification data acquired by the data acquiring unit and that acquires the one of the related data from the related data storing unit;
a correlation table storing unit that stores a correlation table correlating the one of the related data acquired by the related data acquiring unit with the one of the identification data recorded in the operation log by the identification data recording unit, wherein the related data acquiring unit acquires, using the correlation table and the one of the identification data acquired by the data acquiring unit, the one of the related data from the related data storing unit for resolving the abnormality that occurred in the one control target;
a resolution data storing unit that stores first resolution data to resolve the abnormality occurring in the one of the control targets in association with the one of related data acquired by the related data acquiring unit and the abnormality data acquired by the data acquiring unit;
a resolution data acquiring unit that acquires the first resolution data corresponding to the one of the control targets in which the abnormality occurred using the one of related data acquired by the related data acquiring unit and the abnormality data acquired by the data acquiring unit, and
a correction table modifying unit configured to modify the correlation table.

* * * * *